United States Patent [19]

Carson

[11] Patent Number: 4,757,723
[45] Date of Patent: Jul. 19, 1988

[54] SPRINGLOADED END TERMINATIONS FOR ROTARY CABLE DRIVE APPARATUS

[76] Inventor: Donald G. Carson, 12108 Towner Ave., NE., Albuquerque, N. Mex. 87112

[21] Appl. No.: 11,686

[22] Filed: Feb. 6, 1987

[51] Int. Cl.⁴ .................. F16H 27/02; F16H 29/02
[52] U.S. Cl. .................... 74/89.2; 74/10.7
[58] Field of Search .............. 74/89.2, 89.21, 89.22, 74/10.7, 501.5, 496, 506, 517

[56] References Cited

U.S. PATENT DOCUMENTS

| | | | |
|---|---|---|---|
| 1,751,658 | 3/1930 | Ready | 74/10.7 |
| 1,868,553 | 7/1932 | West et al. | 74/10.7 |
| 2,212,823 | 8/1940 | Bulk | 74/89.22 |
| 2,488,792 | 11/1949 | Zindel | 74/10.7 |
| 2,784,595 | 3/1957 | Travis | 74/10.7 |
| 3,645,144 | 2/1972 | Barrows | 74/89.2 |
| 3,695,215 | 10/1972 | Lambiris | 74/89.22 |
| 4,351,197 | 9/1982 | Carson | 74/89.22 |

FOREIGN PATENT DOCUMENTS

| | | | |
|---|---|---|---|
| 111181 | 11/1928 | Austria | 74/10.7 |
| 923442 | 2/1955 | Fed. Rep. of Germany | 74/10.7 |
| 38404 | 3/1931 | France | 74/10.7 |
| 794440 | 5/1958 | United Kingdom | 74/10.7 |

*Primary Examiner*—Lawrence Staab
*Attorney, Agent, or Firm*—H. Gordon Shields

[57] ABSTRACT

Rotary drive apparatus utilizes a cable extending about and between two rotatable members or elements, and the cable end terminations are secured to one of the elements by means of tension springs anchored within one of the elements. The tension springs provide two functions, one function is a pre-load bias on the cable and the second function is a tension force for withdrawing cable ends into the driven member in case of a break in the cable.

8 Claims, 1 Drawing Sheet

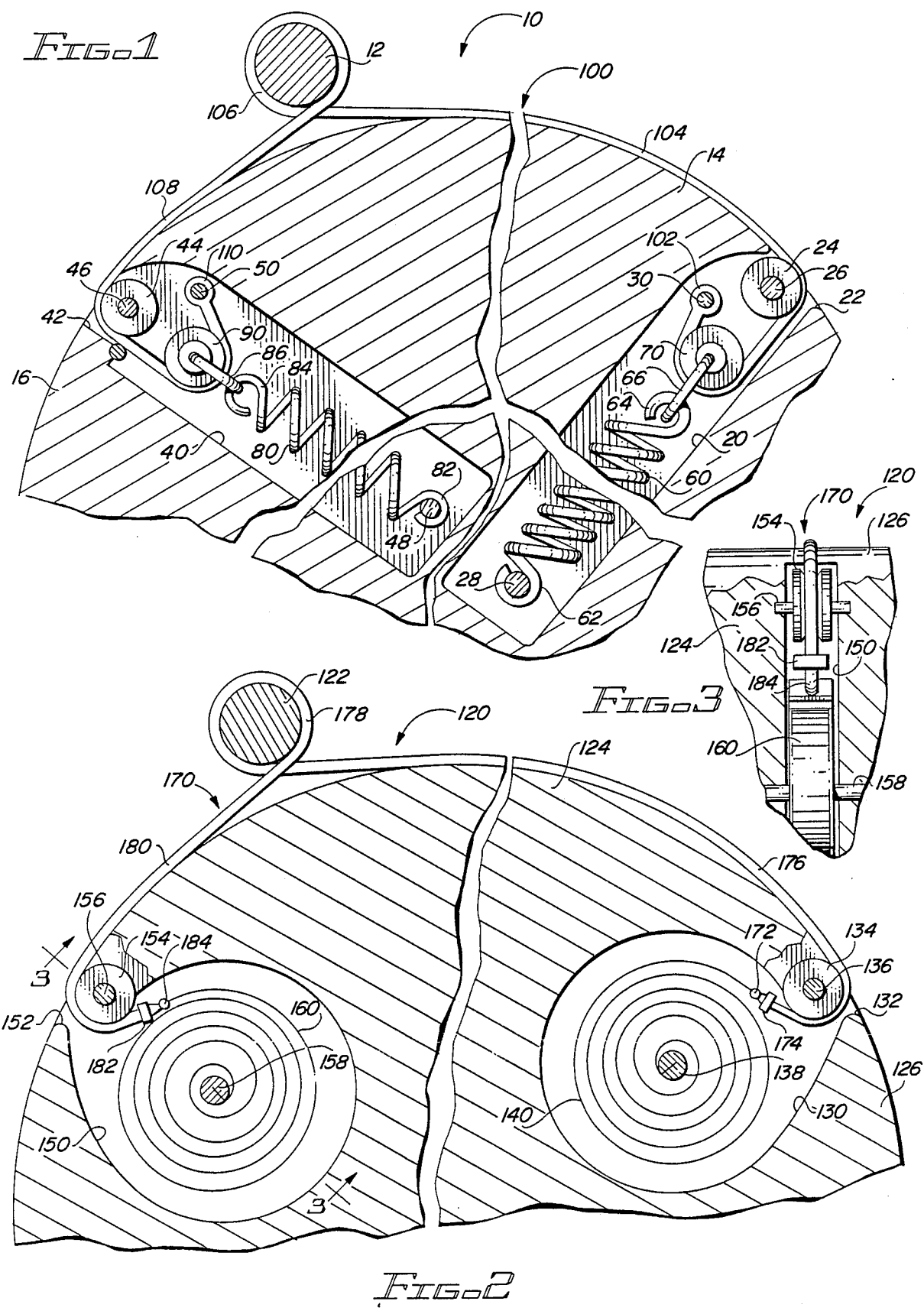

SPRINGLOADED END TERMINATIONS FOR ROTARY CABLE DRIVE APPARATUS

BACKGROUND OF THE INVENTION

1. Field of the Invention

This invention relates to rotary drive apparatus utilizing a cable extending about and secured to a driving element and to a driven element, and, more particularly, to a rotary drive system utilizing a cable terminated at both ends to the driven element through tension springs.

2. Description of the Prior Art

U.S. Pat. No. 4,351,197 (Carson) discloses a rotary drive system in which a threaded screw, driven by a motor, is connected to a driven member, a drum, through a cable connected at both ends to the driven member, the drum. The cable is terminated at one end through a spring arrangement and is terminated at its other end by a solid termination without a spring. It is obvious that the cable may break anywhere along its length. It is also obvious that a break in the cable will result in the free ends of the cable, adjacent to the break, becoming tangled with other cables, if there are a plurality of cables involved. The entanglement will in turn result in substantial problems with the operation of the apparatus.

The apparatus of the present invention provides a solution to the entanglement problem in the event of a cable breakage by utilizing tension springs at both ends of the cable. Thus, in the event of a break in the cable, the free ends of the cable will be retracted by the tension springs. With the tension springs disposed within bores in the driven member, the free ends of the cable will not become entangled with the remaining cable or cables coupling the two members together.

SUMMARY OF THE INVENTION

The invention described and claimed herein comprises a cable termination system in which the free ends of a cable which couples a driving member to a driven member are terminated by tension springs disposed within the driven member.

Among the objects of the present invention are the following:

To provide new and useful rotary drive apparatus;

To provide new and useful rotary drive apparatus in which a driving member is coupled to a driven member through a cable terminated to the driven member;

To provide new and useful apparatus for retracting cable portions into a rotating member;

To provide new and useful apparatus for terminating a cable by tension springs; and To provide new and useful tension spring apparatus for terminating a cable connected between a driven member and a driving member.

BRIEF DESCRIPTION OF THE DRAWING

FIG. 1 is a view in partial section illustrating the apparatus of the present invention.

FIG. 2 is a view in partial section illustrating an alternate embodiment of the apparatus of the present invention.

FIG. 3 is a view taken generally along line 3—3 of FIG. 2.

DESCRIPTION OF THE PREFERRED EMBODIMENT

FIG. 1 is a view in partial section through rotary drive apparatus 10 which includes springloaded end terminations for a cable 100. The rotary drive apparatus 10 includes a relatively small diameter rotating element 12 coupled to a relatively large diameter rotating element or drum 14 by the cable 100. the relatively large diameter rotating element or drum 14 includes an outer periphery 16. Extending inwardly from the outer periphery 16 is a bore or slot 20. An end 102 of the cable 100 is terminated within the slot 20.

The relatively large diameter rotating element or drum 14 includes a second bore or slot 40 extending inwardly from the outer periphery 16. A second end 110 of the cable 100 is terminated in the slot 40.

The slot 20 includes an opening 22 through which a portion of the cable 100 extends. Within the slot 20 is a pulley 24, secured to the element or drum 14 by a pin 26. The cable 100 extends over the pulley 24. The pulley 24 is, of course, journaled for rotation on the pin 26.

Within the slot 20 is an anchor pin 28. The anchor pin 28 anchors one end of a spring 60. The spring 60, a coil would tension spring, provides a relatively constant bias for the cable 100, as will be discussed in detail below.

The slot 40 includes an opening 42 through which extends a portion of the cable 100. The cable 100 extends into the slot 40 through the opening 42 and is disposed over a pulley 44. the pulley 44 is journaled for rotation on a pin 46 which secures the pulley 44 in the drum 14.

Remote from the opening 42 is an anchor pin 48 for a second coil wound tension spring 80. The anchor pin is used to anchor one end of the tension spring 80. The spring 80 also provide s relatively constant tension bias for the cable 100, as will be discussed below.

The tension spring 60 is disposed within the bore or slot 20. One end of the tension spring 60 includes a loop 62, which is disposed about the anchor pin 28. the opposite end of the spring 60 from the loop 62 includes a loop 64 which is disposed about a link 66. The link 66 couples the spring 60 to a pulley 70. The cable 100 extends about the pulley 24, through the opening 22, and about the spring pulley 70. The end 102 of the cable 100 is secured to the drum 14 by an anchor pin 30.

The spring 80 is disposed within the bore or slot 40, and it includes a loop 82 which is disposed about the anchor pin 48. the opposite end of the spring 80, remote from the loop 82 and the pin 48, includes a loop 84 which is disposed about a link 86. The link 86 couples the spring 80 to a pulley 90. The opposite end of the cable 100, remote from the end 102, extends over the pulley 44, through the opening 42, and about the pulley 90. The end 110 of the cable 100 is anchored within the slot 40 by an anchor pin 50.

The cable 100 thus extends from its end 102, about the pulley 70, and through the opening 22, about the pulley 24 to the outer periphery 16 of the drum 14. An intermediate portion 104 of the cable 100 is disposed against the outer periphery 16 of the drum 14 for a predetermined angular distance or arcuate distance. The cable 100 then extends in a loop 106 about the relatively small diameter rotating element 12. From the element 12, another intermediate portion 108 of the cable 100 extends again on the outer periphery 16 of the drum 14 to the opening 42 and into the slot 40, about the pulley 44, and about the pulley 90 and to the end 110 which is terminated within the slot 40 by the anchor pin 50.

The two springs 60 and 80 provide relatively constant tension bias for the cable 100. It will be noted, as shown in FIG. 1, that the spring 60 includes more coils than does the spring 80. the spring 60 is a relatively strong spring, and the spring 80 is a relatively weak spring. For example, the spring 60 may be a ten pound spring while the spring 80 may be a two pound spring.

If the cable 100 should break anywhere between its ends 102 and 110, the springs 60 and 80 would exert sufficient tension to cause the broken cable portions to be pulled or to be retracted fully within the slots 20 and 40. It will accordingly be understood that the slots 20 and 40 are long enough to fully accommodate the cable 100 within each slot regardless of where a break in the cable 100 should take place.

The ability of a cable to thus be fully retracted within a slot becomes increasingly important as the number of cables coupling the two rotatable members increases. Thus, if there is only one cable, a single cable, coupling the rotating elements 12 and 14, then a double spring termination, as shown in FIG. 1, may not be necessary, since a break in the cable will not cause the ends of the broken cable to interfere with any other cables. However, if there is more than one cable coupling the rotating elements, a break in a cable may cause the broken ends of the cable to become entangled in the other cable or other cables. In such case, the entanglement could cause substantial havoc to the operation of the rotary drive apparatus. However, with each cable terminated by a tension spring at each end, not only does a broken cable not become entangled with the other cable or cables coupling the rotating elements, but also the broken cable ends are completely retracted into the interior of the relatively large diameter rotating element, and thus are completely out of the way of the other cables.

It will be noted that the bore or slots 20 and 40 are shown arcuately disposed from each other by only about ninety degrees. However, it will be understood that, in operation, the slots maybe disposed a substantially greater distance apart. Moreover, the angular orientation of the slots with respect to the outer periphery of a rotatable element depends on the diameter of the rotating element or drum, on the diameter of the coils in a tension spring, and in the overall length of the spring.

It will also be noted that the ends 102 and 110 are not terminated directly to the springs 60 and 80, but rather are hard terminated to the relatively large diameter rotating element 14 by pins 30 and 50, respectively. However, the ends 102 and 110 are connected through the pulleys 70 and 90, respectively, by the springs 60 and 80, respectively, to provide a doubling effect for any cable portions upon retraction of the cable 100 in event of a break.

By use of the actual hard termination of the cable ends by the pins 30 and 50 adjacent to the openings 22 and 42, respectively, the use of the pulleys connected to the cable and to the tension springs provides that any broken cable portions will be doubled as the broken cable portions are pulled into the bores 20 and 40. Essentially, this means that the bores 20 and 40 need to be only about half as long as would be required if the cable ends were secured directly to the tension springs. With the cable connected to the springs through pulleys, and with the ends of the cable fixed, the cable going into the bores is doubled.

It will be further noted that compression springs could be used in place of tension springs. However, the use of compression springs would require a pair of keeper elements, one of which would be fixed adjacent to the openings 22 and 42, and the other of which would be secured in any of several well known manners to the spring. The use of compression springs would require substantially longer bores or slots. It is believed that the employment of tension springs is more practical under the circumstances.

FIG. 2 is a view in partial section of an alternate embodiment 120 of the apparatus illustrated in FIG. 1. In the embodiment of rotary drive apparatus 120, a pair of spiral wound springs 140 and 160 are shown disposed within a pair of circular bores or slots 130 and 150, respectively. The spiral wound springs 140 and 160, sometimes referred to as clock springs, are contrasted with the helically wound or coil wound tension springs 60 and 80 of FIG. 1.

FIG. 2 is a view in partial section of the apparatus 120 taken generally along line 3—3 of FIG. 2. For the following discussion, reference will primarily be made to FIGS. 2 and 3.

The rotary drive apparatus 120 includes a relatively small diameter rotating element 122 coupled to a relatively large diameter rotating element or drum 124 by a cable 170. The relatively large diameter rotating element or drum 124 includes an outer periphery 126. Extending inwardly from the outer periphery 126 of the drum 124 are two circular bores or slots, a circular bore or slot 30 and a circular bore or slot 150. The cable 120 includes a pair of ends, an end 172 and an end 184. The end 172 is secured to a spring 140 within the slot 130, and the end 184 is secured to a spring 160 within the slot 150.

The circular slot 130 includes a mouth opening 132 at the outer periphery 126 of the drum 124. A pulley 134 is disposed at the mouth 132 and is journaled for rotation on a pin 136. The cable 170 extends about the pulley 134. Within the slot 130 is an anchor pin 138 for the spring 140. The spring 140 is a spiral spring, or clock spring, which provides a substantially constant bias for the cable 170.

The circular slot 150 includes an opening 152 at the outer periphery 126 of the drum 124. A pulley 154 is journaled for rotation on the pin 156 at the opening 152. The cable 170 extends over the pulley 154. Within the slot 150 is an anchor pin 158 for securing the spring 160 within the slot 150. The spring 160, like the spring 140, is a spiral or clock spring, which also provides a substantially constant tension bias for the cable 170.

Like the cables 60 and 80, the springs 140 and 160 are preferably of different spring forces or rates, with the spring 140 preferably substantially stronger than the spring 160. For example, as discussed above, the spring 140 may be a ten pound spring, while the spring 160 may be a two pound spring.

The springs 140 and 160 include free ends remote from their anchor pins 138 and 158, respectively. The cable ends 172 and 184 are appropriately secured to the free ends of the springs 140 and 160, respectively.

Adjacent to the end 172 of the cable 170 is a stop element 174. The stop element 174 is larger than the mouth 132, and accordingly the cable may be retracted or pulled into the slot 130, but the stop element or keeper 174 prevents the cable 170 from going out of the slot 140.

The cable 170 includes an intermediate portion 176 disposed about the periphery 126 of the drum 124 between the pulley 134 and the relatively small diameter rotating element 122. A loop of the cable 170 is disposed about the rotating element 122. Between the loop 178 and the opening 152 is another intermediate portion 180 of the cable. The intermediate portion 180 is again disposed against the outer periphery 122 of the rotating element or drum 124.

A stop element 182 is secured to the cable 170 adjacent to the end 184. The stop element 182 is substantially identical to the stop element 174, and provides the identical function of preventing the cable 170 from being fully withdrawn out of the slot 150. Thus, the cable 170 may be drawn into the slot 150, but cannot go fully out of the slot 150.

If a break should occur in the cable 170 between its ends 172 and 184, the spiral tension springs 140 and 150 would retract the broken ends, or the two portions, of the cable 170 fully within the slots 130 and 150 in order to prevent the cable 170, or the portions thereof, from becoming entangled with another cable, or other cables, also disposed about the rotating elements 122 and 124. Again, it will be understood that the slots 130 are of sufficient size to fully receive the cable 170, regardless of where a break occurs in the cable.

It will be noted that the relatively large diameter rotating elements 14 and 124, as well as the relatively small diameter rotating elements 12 and 122, have not been characterized as to the configuration of their periphery, whether grooved, smooth, or helically configured. It will be understood that the springloaded end terminations for the cables coupling the rotating elements together is not limited to a particular rotating element configuration. The springloaded end terminations will function satisfactorily with smooth outer peripheral elements, or helical or grooved outer peripheral configurations or combinations thereof. The primary purpose of the tension spring end terminations is, of course, to fully retract the broken portions of a coupling cable within the rotating drum or element to prevent the entanglement of the broken ends with other cables which may also be coupling the elements together.

It will be noted that pulleys are used to couple the coil springs 60 and 80 to the cable 100 in the embodiment of FIG. 1. The cable ends 102 and 110 are accordingly "hard" terminated to the drum 14, through the pins 30 and 50, respectively. However, if desired, the pulleys 70 and 90, and the ends 30 and 50, maybe eliminated by coupling the cable ends 102 and 110 directly to the spring ends 64 and 84, respectively, of the springs 60 and 80. The links 66 and 86 will, of course, also be eliminated by coupling the ends 102 and 110 directly to the spring.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Rotary drive apparatus, comprising, in combination:
   first rotatable member means;
   second rotatable member means having a first bore and a second bore;
   cable means coupling the first and second rotatable members together for joint rotation, including a first end disposed in the first bore and a second end disposed in the second bore; and
   spring means connected to the first and second ends for preloading the cable means and for fully retracting the cable means into the first and second bores in the event of a break in the cable means.

2. The apparatus of claim 1 in which the spring means includes a first spring disposed in the first bore and connected to the first end, and a second spring disposed in the second bore and secured to the second end.

3. The apparatus of claim 2 in which the spring means further includes a first end on the first spring and a second end on the first spring, and the first end of the first spring is secured to the second rotatable member and the second end of the first spring is connected to the first end of the cable means.

4. The apparatus of claim 3 in which the spring means further includes a first pulley, and the cable means extends about the pulley and the second end of the first spring is secured to the pulley.

5. The apparatus of claim 4 in which the spring means further includes a third end on the second spring and a fourth end on the second spring, and the third end is secured to the rotatable member and the fourth end is connected to the second end of the cable means.

6. The apparatus of claim 5 in which the spring means further includes a second pulley, and the cable means extends about the pulley and the fourth end of the second spring is secured to the pulley.

7. The apparatus of claim 2 in which the first spring and the second spring of the spring means are coil wound tension springs.

8. The apparatus of claim 2 in which the first spring and the second spring of the spring means are spiral wound springs.

* * * * *